US010824993B2

United States Patent
Young et al.

(10) Patent No.: US 10,824,993 B2
(45) Date of Patent: Nov. 3, 2020

(54) STORY-MODE USER INTERFACE

(71) Applicant: BMC SOFTWARE, INC., Houston, TX (US)

(72) Inventors: Cedric Young, Markham (CA);
Jek-Sun Wong, Brooklin (CA);
Artemios Tavoularis, Whitby (CA);
Steve Wong, Markham (CA);
Sun-Chun Chu, Richmond Hill (CA);
Thomas L. Adrian, Dublin, CA (US)

(73) Assignee: BMC Software, Inc., Houston, TX (US)

( * ) Notice: Subject to any disclaimer, the term of this patent is extended or adjusted under 35 U.S.C. 154(b) by 7 days.

(21) Appl. No.: 13/842,252

(22) Filed: Mar. 15, 2013

(65) Prior Publication Data
US 2014/0282010 A1 Sep. 18, 2014

(51) Int. Cl.
G06Q 10/10 (2012.01)
G06Q 10/06 (2012.01)
G06F 11/07 (2006.01)
G06F 3/0484 (2013.01)

(52) U.S. Cl.
CPC .......... G06Q 10/10 (2013.01); G06F 11/079 (2013.01); G06Q 10/06 (2013.01); G06F 3/0484 (2013.01)

(58) Field of Classification Search
CPC .............. G06F 17/30056; G06F 3/048; G06F 17/30991; G06F 17/048; G06F 3/0484; G06F 11/079; G06Q 10/06; G06Q 10/10
USPC ....................................... 715/730
See application file for complete search history.

(56) References Cited

U.S. PATENT DOCUMENTS

| 5,890,130 | A | * | 3/1999 | Cox ................... G06Q 10/0633 345/440 |
| 6,859,783 | B2 | * | 2/2005 | Cogger et al. ................ 709/223 |
| 7,225,139 | B1 | * | 5/2007 | Tidwell et al. .............. 705/7.15 |
| 7,672,969 | B1 | * | 3/2010 | Gawdiak et al. ...... 707/999.102 |
| 7,818,658 | B2 | * | 10/2010 | Chen ................ G06F 17/30056 715/201 |
| 8,489,735 | B2 | * | 7/2013 | Befort ................. G06F 11/0709 709/224 |
| 8,650,335 | B2 | * | 2/2014 | Brice et al. ..................... 710/20 |
| 8,806,355 | B2 | * | 8/2014 | Twiss ..................... G06Q 10/10 715/753 |
| 9,400,594 | B1 | * | 7/2016 | Zarcheany ............. G06Q 10/10 |
| 2007/0266142 | A1 | * | 11/2007 | Nastacio ............. G06F 11/0709 709/224 |
| 2009/0234698 | A1 | * | 9/2009 | Watson ............ G06Q 10/06311 705/7.28 |
| 2009/0241048 | A1 | * | 9/2009 | Augustine et al. ........... 715/769 |
| 2009/0287630 | A1 | * | 11/2009 | Kaiser ..................... G06N 5/02 706/50 |

(Continued)

*Primary Examiner* — James T Tsai
(74) *Attorney, Agent, or Firm* — Brake Hughes Bellermann LLP

(57) ABSTRACT

A method includes displaying, in a single story-mode presentation on a user interface, information on events occurring in and/or related to a business process managed by a business process management application. The single story-mode presentation includes a time map navigation section that displays a time map of events relevant to a first business task or object of the business process along a first time line, and an event details section that contains information corresponding to the events displayed in the time map navigation section.

20 Claims, 12 Drawing Sheets

(56) References Cited

U.S. PATENT DOCUMENTS

| | | | | |
|---|---|---|---|---|
| 2009/0313219 | A1* | 12/2009 | Gupta | G06Q 10/10 |
| 2010/0005384 | A1* | 1/2010 | Grabarnik | G06Q 10/06 |
| | | | | 715/231 |
| 2010/0169859 | A1* | 7/2010 | Bergman | G06Q 10/06 |
| | | | | 717/102 |
| 2012/0004947 | A1* | 1/2012 | Dombrowski | G06F 3/04847 |
| | | | | 705/7.29 |
| 2013/0007626 | A1* | 1/2013 | Adams et al. | 715/738 |
| 2013/0073470 | A1* | 3/2013 | White | G06Q 10/10 |
| | | | | 705/304 |
| 2013/0085961 | A1* | 4/2013 | Naghshin | G06Q 10/06 |
| | | | | 705/348 |
| 2013/0124990 | A1* | 5/2013 | Lettau | 715/716 |
| 2013/0227382 | A1* | 8/2013 | Boulila | 715/201 |
| 2014/0157170 | A1* | 6/2014 | Elias | 715/771 |
| 2014/0172856 | A1* | 6/2014 | Imbruce | G06F 17/212 |
| | | | | 707/737 |

* cited by examiner

STORY-MODE USER INTERFACE

TECHNICAL FIELD

The present disclosure relates generally to user-interfaces of databases and computing systems. The disclosure, in particular, relates to presentation of data on user interfaces.

BACKGROUND

Business software or business applications refer to any software or set of computer programs that are used by business users to perform various business functions. The business applications, which are used, for example, for process automation, business process management, workflow management, etc., allow users to perform business functions or tasks accurately.

Common business applications use a forms-driven approach to business process and workflow management. A business application can collect and store (e.g., in a database) large amounts of information or data, which may be related to a business function or task. The information or data is presented to task workers on a user interface. The user interface is often graphical and can offer tools, which can make the interaction with the database easier. The user-interfaces of common business applications are form-based, consisting of mostly of forms. The user may be able to view fields in the forms and make new entries to the database or only some of the fields to query the other fields.

For some business functions (e.g., Information Technology Service Management (ITSM) functions), which involve diverse pieces of information or data, the form-based approach used by a business management application can be confusing and overwhelming to users. For example, current ITSM applications for IT Service Desk or ITSM ticketing functions provide IT support staff with form-based user interfaces. The form-based user interfaces while suitable for data entry related to a particular business event (e.g., an IT incident or ticket) do not provide a quick understanding of a range of information that may be required to resolve the IT incident or ticket. The IT support staff must diligently peruse through large amounts of form data to develop their own understanding of what has happened to a ticket (e.g. Incident, Change, Problem, etc.). The IT support staff may not be experts in the ITSM application that is used to track IT tickets, and may have to struggle to find relevant information that may be variously displayed on the form-based user interfaces. The relevant information may, for example, be displayed within various sections of a primary form, accessible only using various functions within the primary form, or reside in related forms that require additional searching. Further, even if the IT support staff is able to locate all relevant information through the form-based interface, they have to manually construct a sequence of related events from all the information sources to develop an understanding of what happened.

Consideration is now being given to further ways of conveying business data and information on user-interfaces of business applications.

SUMMARY

In the context of a business process management application (e.g. Information Technology Services Management) understanding where an IT service ticket is in its lifecycle and knowing key business events that have occurred can assist with resolving the ticket. Knowing who has previously worked on the ticket and what important work has been done to date helps an IT support staff person in resolving the ticket. In general understanding an end-to-end story of a ticket can only help the IT support staff person in resolving the ticket.

In a general aspect an apparatus includes, at least one processor, and a non-transitory computer-readable storage medium including instructions executable by the at least one processor. The instructions configured to implement a user-interface of a business process management application. The user-interface is configured to display information on events occurring in and/or related to a business process managed by the business process management application, and further configured to visually display the information on the events occurring in and/or related to the business process in a single story-mode presentation.

In an aspect, the single story-mode presentation includes a time map navigation section that displays a time map of events relevant to a first business task or object of the business process along a first time line and which may display a time map of events relevant to a second business task or object of the business process along a second time line parallel to the first time line.

In a further aspect, the single story-mode presentation includes an event details section that contains information corresponding to the events displayed in the time map navigation section of the single story-mode presentation. The event details section may include narrative descriptions of the events including one or more of who, what, when, where, why, in what way, and/or by what means types of descriptions.

In a further aspect, the events displayed the single story-mode presentation are visually highlighted by event category.

In an aspect, the business application is an Information Technology Services Management (ITSM) system application, and the user-interface in the apparatus is configured to visually display the information on the events occurring in and/or related to processing an IT service ticket in the single story-mode presentation.

In an aspect, the single story-mode presentation overlays a forms-based UI associated with the ITSM system application. The forms-based UI is configured to visually display an IT service ticket having a story-mode control or function that can be activated or switched by a user to display the information on the events occurring in and/or related to processing the IT service ticket in the single story-mode presentation.

In a general aspect a method includes displaying the information on the events occurring in and/or related to the business process in a single story-mode presentation on a user interface, and displaying a time map of events relevant to a first business task or object of the business process along a first time line in a time map navigation section of the single story-mode presentation on the user interface (1220). In a further aspect the method includes displaying, in the time map navigation section, a time map of events relevant to a second business task or object of the business process along a second time line parallel to the first time line (1230).

In an aspect the method, also include displaying information corresponding to the events displayed in the time map navigation section of the single story-mode presentation in an event details section of the single story-mode presentation on the user interface, displaying narrative descriptions of the events including one or more of who, what, when, where, why, in what way, and/or by what means types of descriptions and visually highlighting the events displayed in the single story-mode presentation by event category.

For all of the above aspects, the method may involve abstracting the information to be displayed independent of backend implementation details of the business process management application regarding sourcing of the information.

In a general aspect a non-transitory computer-readable medium stores instructions for displaying information on events occurring in and/or related to a business process managed by a business process management application. The instructions when executed by one or more processors may display the information on the events occurring in and/or related to the business process in a single story-mode presentation on a user interface. The single story-mode presentation may include a time map navigation section that displays a time map of events relevant to a first business task or object of the business process along a first time line, and an event details section that contains information corresponding to the events displayed in the time map navigation section of the single story-mode presentation.

BRIEF DESCRIPTION OF THE DRAWINGS

FIG. 2 is an illustration of an example "defect" form ticket that may be displayed as a page on a form-based UI of a business process management application.

FIGS. 3-6 are schematic illustrations of the laborious navigation a user may have to undertake to locate and view information through the form ticket of FIG. 2.

FIGS. 7 and 8 show an example story-mode UI display 700, which presents an IT service ticket in story mode, in accordance with the principles of the disclosure herein.

DETAILED DESCRIPTION

A user-interface of a business application is configured to present business information and data, which may be related to a business event, in a story-mode or narrative picture-type presentation, in accordance with the principles of the disclosure herein. The disclosed user-interface, which may be referred to herein as the "story-mode UI" or the "story-mode presentation," may sit on top of any form-based UI of the business application.

The story-mode presentation related to a business event, which may include time-lines of related or associated events, may be abstracted from data in forms collected or generated by the business application or other areas of the business application. The story-mode presentation may provide a user of the business application (regardless of whether the user is a novice user or an expert user) easy and intuitive access to information related to the business event. The user may get a relevant and complete picture surrounding the business event without having to know which particular forms or portions of forms or other areas of the business application contain the information used to construct the story-mode presentation.

The term "business event" as used herein will be understood to include both intangible objects (e.g., happenings, tasks, processes, activities, conversations, etc.) and also, in context, tangible objects (e.g., software objects, hardware, items, things, data, etc.) of a business process managed by a business application.

In the following, implementations of the story-mode UI are described in the context of example form-based business applications (e.g., Information Technology Services Management (ITSM) applications). It will be understood that the examples described herein are only for purposes of illustration and not intended to be limiting.

The services provided by an ITSM application may encompass one or both of Incident space and Configuration Item (CI) space. The Incident space may, for example, include showing causes, circumstances, and consequences of a problem or defect, barriers to a solution and actions to be taken. The CI space may include IT assets or a combination of IT assets that may depend and have relationships with other IT processes. CI attributes may, for example, include: technical data that describes the CI's capabilities including software version and model numbers, hardware items and manufacturer specifications and other technical details like networking speeds and data storage size; ownership data such as purchase date, warranty, location and responsible person for the CI, identification numbers and documentation; and relationship data such as relationships between hardware items (e.g. a printer), software (e.g. drivers), and users (e.g., Robert, Mary, etc.).

Figure 1:
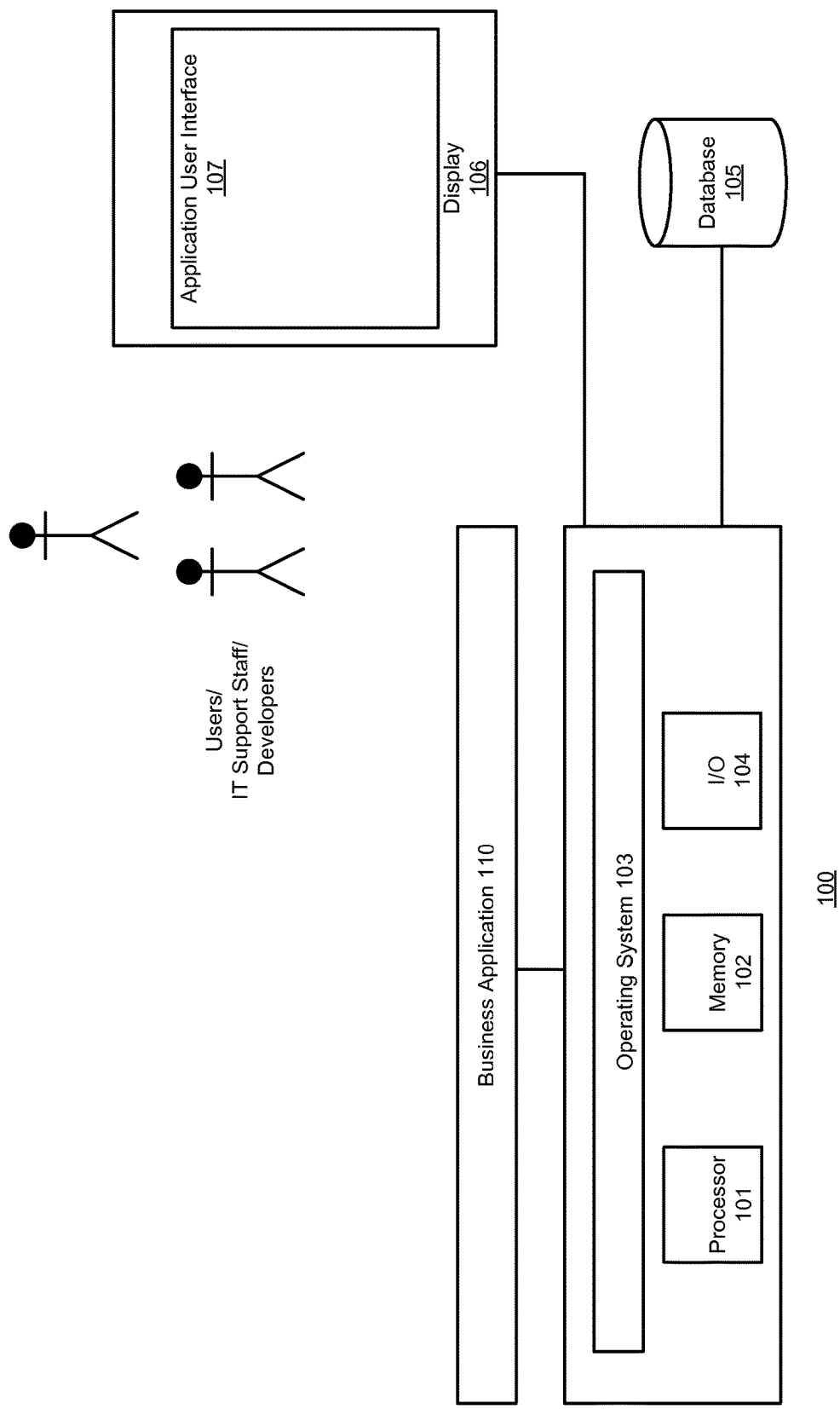
FIG. 1 is a block diagram illustration of an example business application hosted on a standalone or networked computer.

FIG. 1 shows an example business application 110 hosted on a standalone or networked computer 100. Computer 100, which may, for example, include a processor 101, a memory 102, an O/S 103, and I/O 104, may be coupled to a database 105 and a display 106. An example business application 110 may be a particular ITSM application, namely a Remedy Quality Management System application that may be used track defects in various products. Application 110 may present a conventional form-based user interface UI 107 on display 106.

Form-based tickets may be generated by or input in the Remedy Quality Management System application to record or report defects in products. When a defect is assigned to a developer to remedy, the developer may need look at various areas within a displayed form ticket to understand what this issue is about, what has been done, etc.

Figure 2:
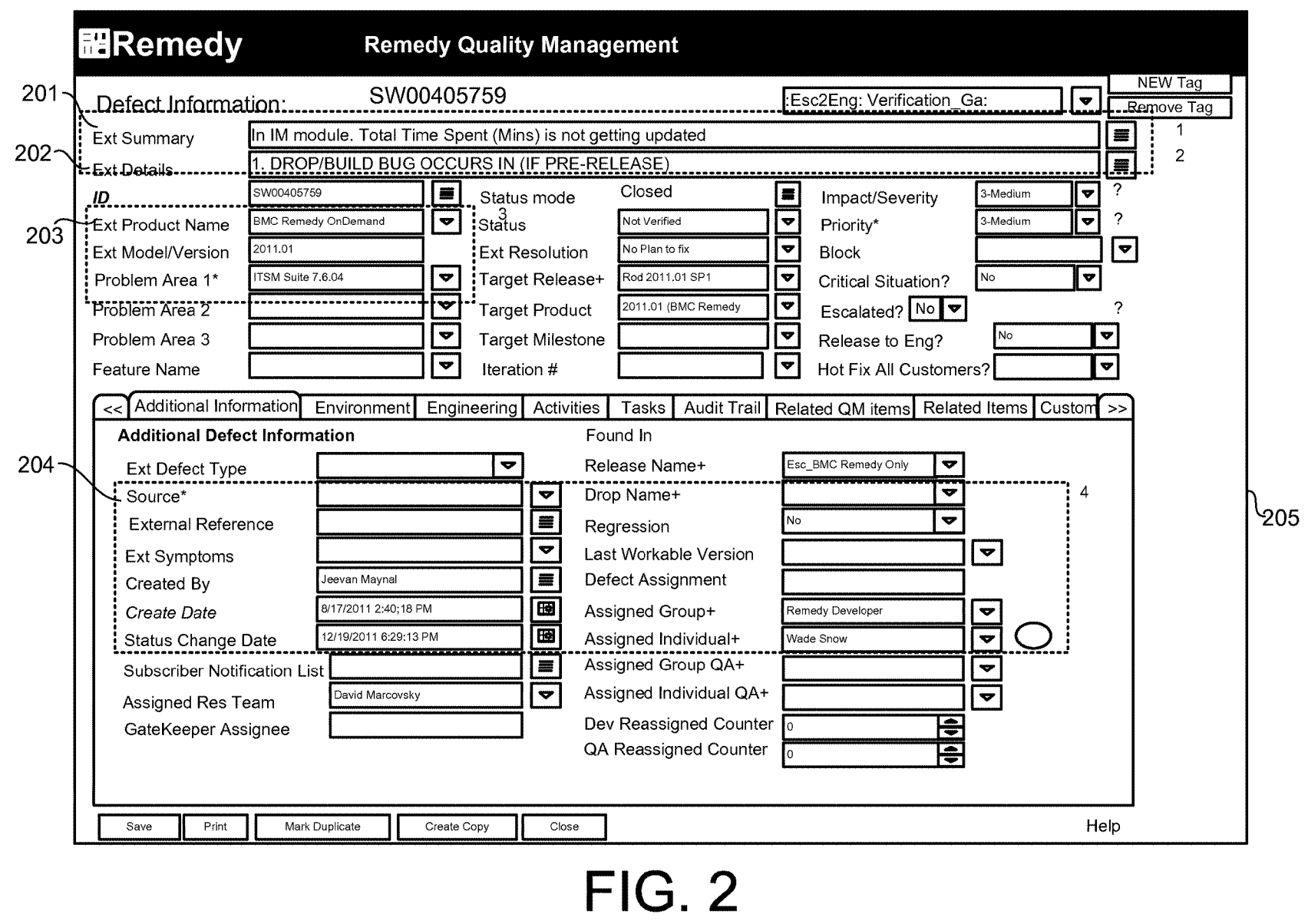

FIG. 2 shows an example "defect" form ticket 200 that may be displayed for example, as a page on the form-based UI of the application. The defect ticket may include links, search fields, drop down menus, tabs (e.g., Environment, Engineering, Activities, Task, Audit Trail, Related QM items, Related Items, etc.), or other controls that lead to other forms or data regions. FIG. 2 further shows common attributes and/or sections of ticket 200 (e.g., Summary 201, Details 202, Product Name and Version 203, Defect Source 204 and Assignment 205, etc.) that the user may have to navigate to in order get some relevant information to construct a picture of what the defect issue is about and what has happened to the ticket so far.

Figure 3:
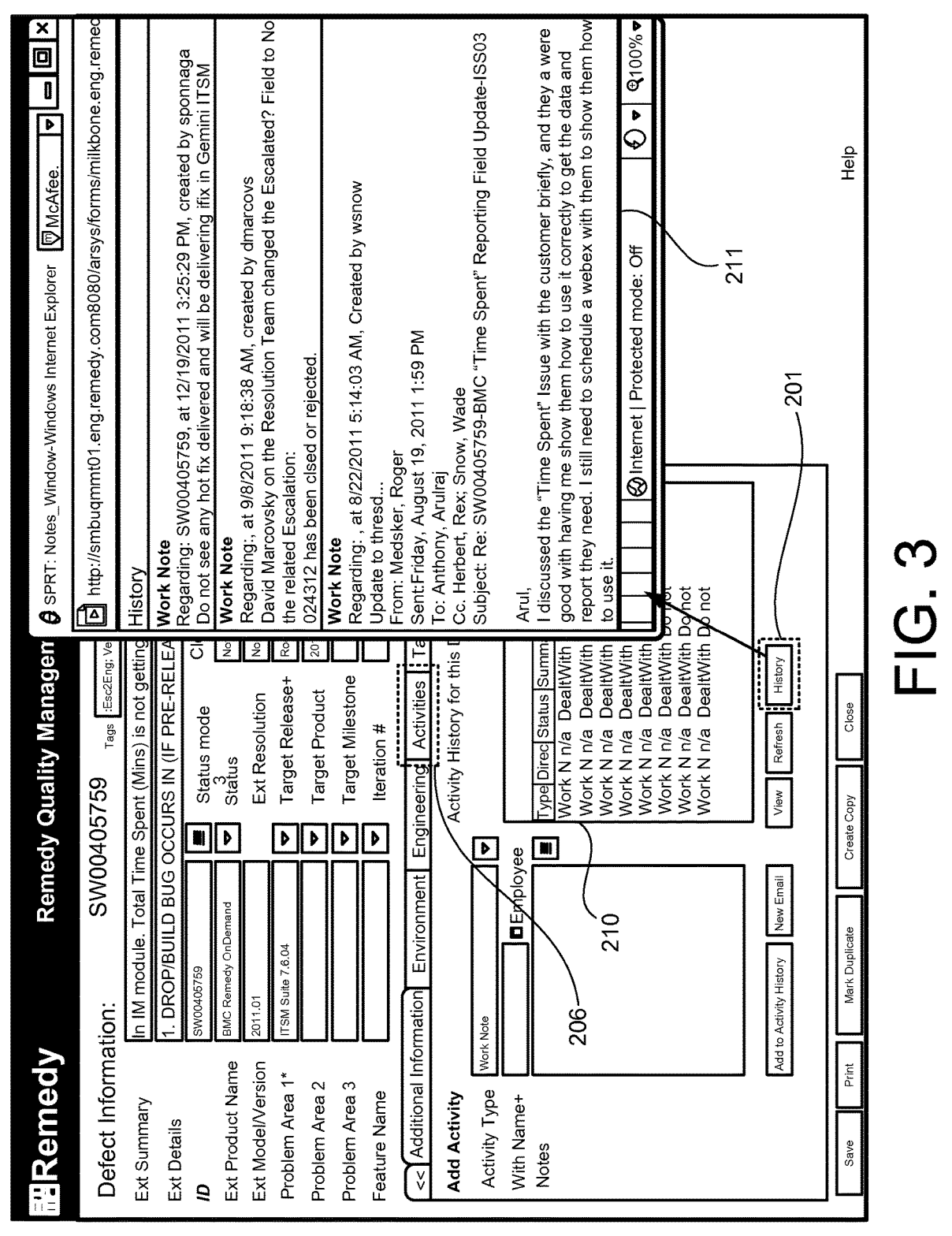
Figure 4:
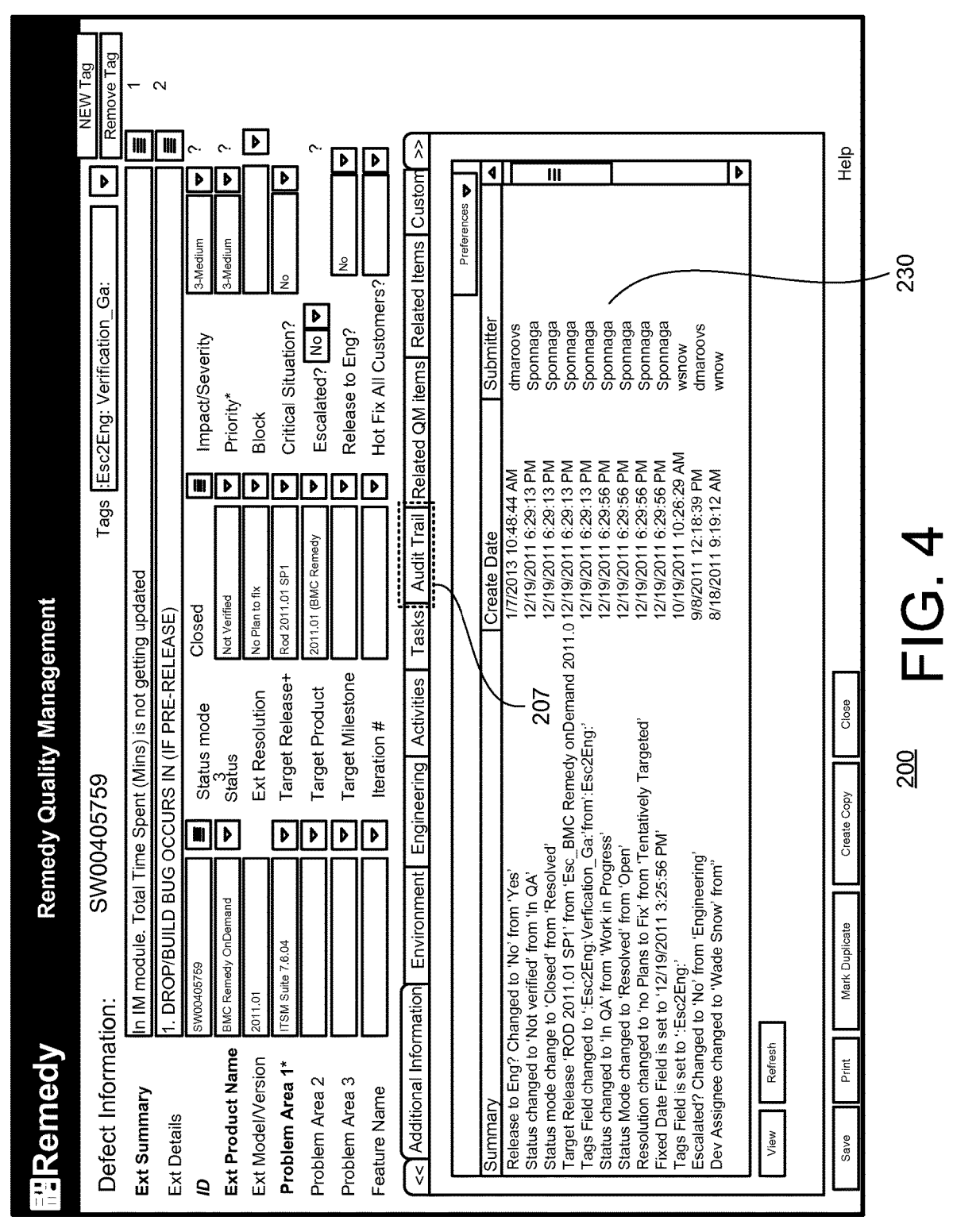
Figure 5:
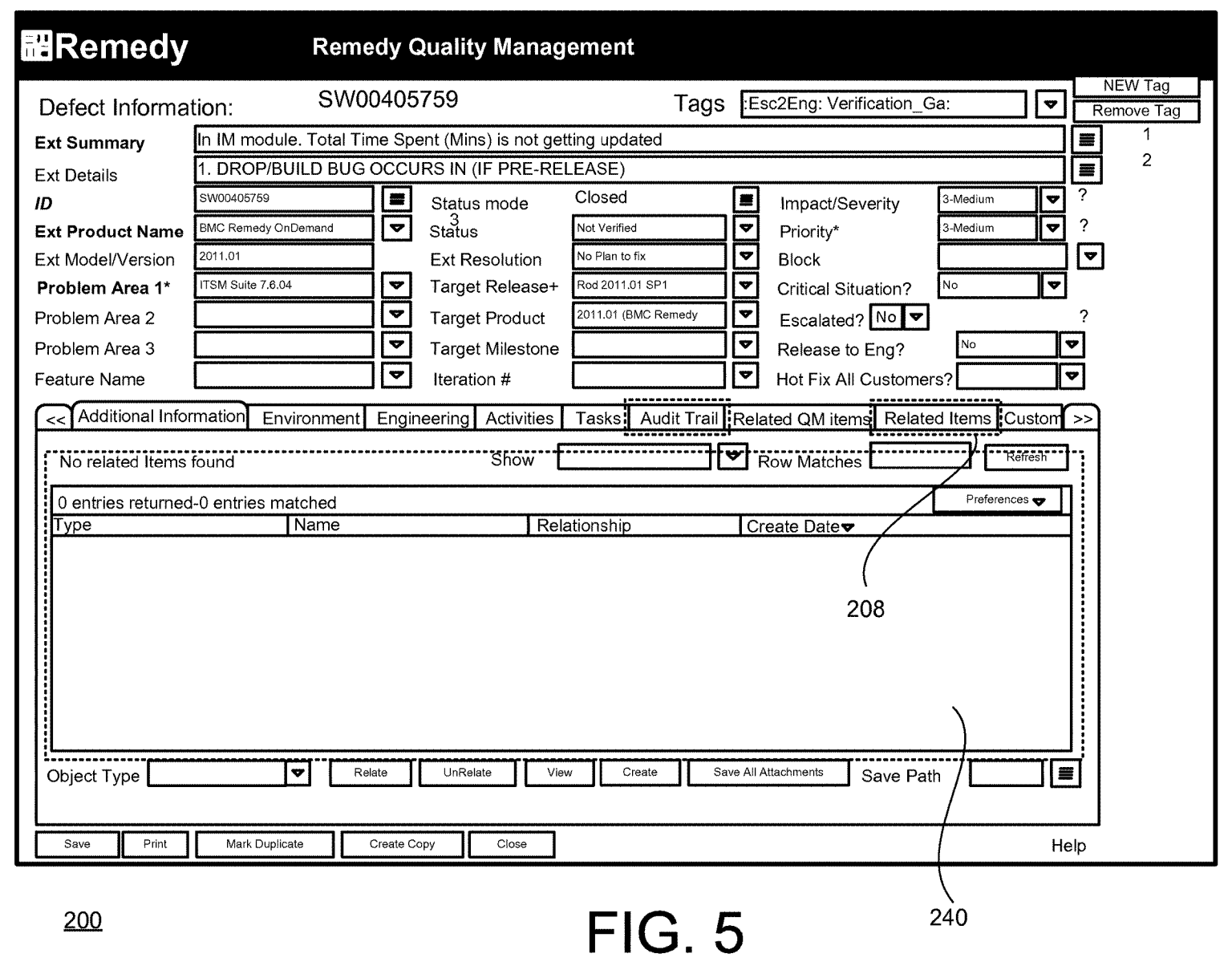
Figure 6:
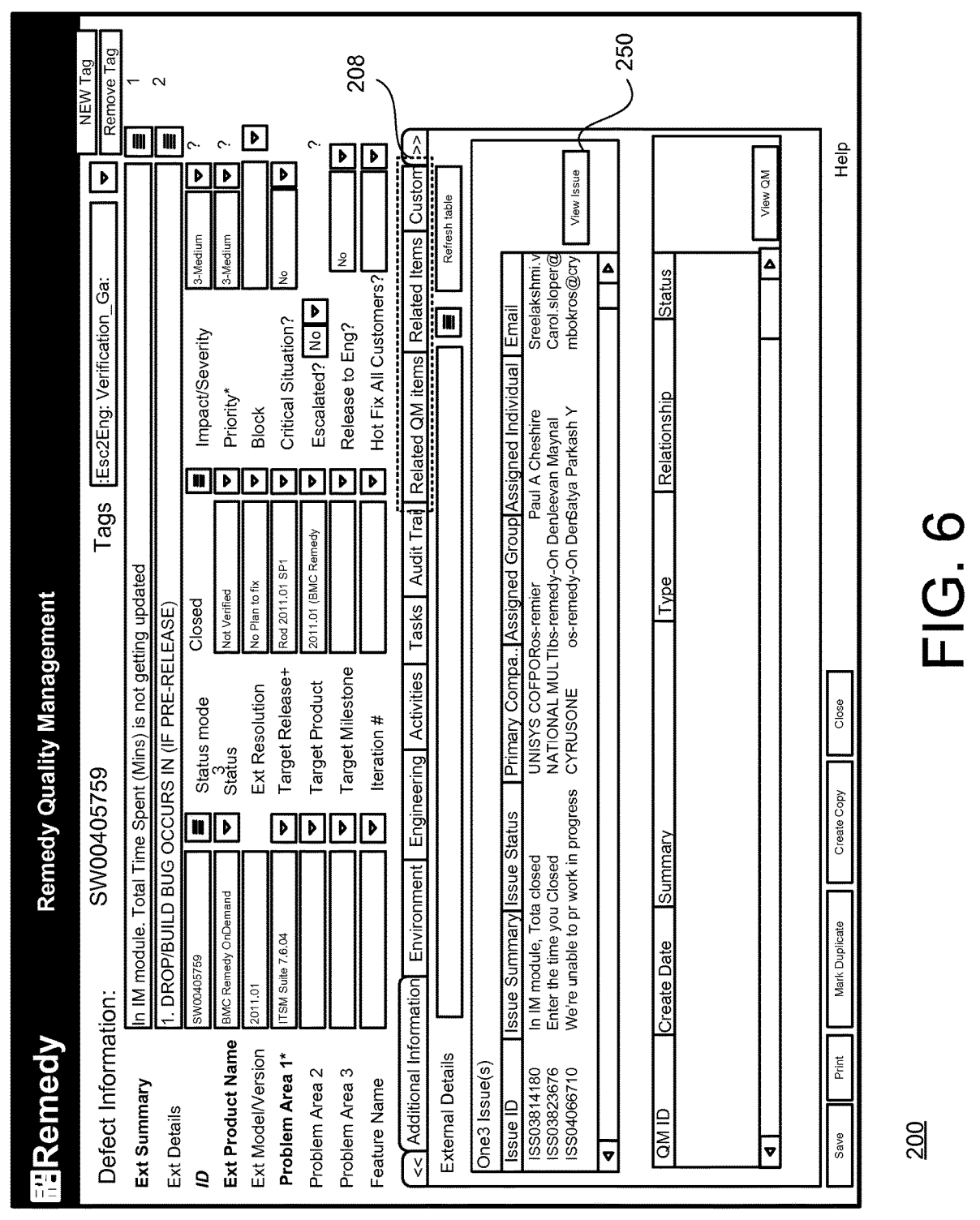

FIGS. 3-6 illustrate the laborious navigation the user may have to undertake to locate and view the relevant information. To see more information, as shown in FIG. 3, the developer may, for example, have to further navigate through Activities tab 206 on ticket 200 to another form 210 to view a listing of activities on the defect and then navigate through a History tab 211 to yet another form 220 to view notes of what was done in each of the listed activities. FIG. 4 shows that the developer may have to further navigate through an Audit tab 207 to still another form 230 see an audit trail of what has happened on the defect. FIG. 5 shows that the developer may have to navigate through a Related Items tab 208 to yet another form 240 to view related items. FIG. 6 shows that the developer may have to navigate through a Related Tickets tab 209 to see to yet another form 250, which, for example, lists three related Customer Service defect tickets. Each of the three related Customer Service defect tickets may have their own UI display, which like ticket 200 may have a number of areas the developer may have to navigate to in order to view information.

It may be expected that an individual developer may take several minutes to complete the many steps required to navigate through a ticket (e.g., ticket 200) to garner relevant information. In many instances, the individual developer may not be aware of where information is stored within a ticket and may not see or find information relevant to resolution of the defect. Further different developers may navigate through the ticket differently and gather information in an inconsistent manner from one individual developer to another, which may again hinder collaborative resolution of the defect.

It will be noted that resolution of a defect ticket may often involve several developers working serially over an extended period of time. A developer may, for example, want to see what updates have occurred with a ticket since the last time he or she viewed the ticket and which other developer made the updates. With the form-based UI, the developer may have to manually and actively search for the updates and then manually try to figure out how to contact the other developers who made the updates if further clarification is required.

Thus with a conventional form-based UI such as UI 200, it may be time consuming for a developer to get a clear picture of what has transpired during the life cycle of a ticket, including key business events that may have occurred. There may be too many areas of the form-based UI for a developer to effectively navigate through to find information. In some instances, important information may be missed or overlooked. There may be no easy way to see what "new" updates have been made to a ticket that a developer is working on and no easy way to collaborate with other developers working on the same ticket. These drawbacks of conventional form-based UI's may hinder or delay resolution of the defect, and lead to inconsistent triage or resolution outcomes.

In accordance with the principles of the present disclosure, a story-mode UI for a business application (e.g., an ITSM application) may include a time-line based navigation mechanism and a board or wall to display information related to business tasks (e.g., IT service tickets), objects (e.g., IT hardware) and/or events occurring in or related to a business process managed by the business application. The story-mode UI display of the present disclosure may be configured to render information provided to it using a defined display configuration format.

The story-mode UI display for an IT service ticket of ITSM application may, for example, be based on information gathered from work notes and activity logs, information gathered from system events and audits (which may include information on who has worked on the ticket), key business events that may have occurred before and during the life cycle of the ticket, notifications of both internal and external events (e.g. customer updates, etc.), and information gathered from other applications and/or external systems. The story-mode UI may overlay any forms-based UI associated with the ITSM application. The story-mode UI display may be designed to abstract the information independent of any backend implementation details regarding how the source data is retrieved.

The story-mode UI display may provide a holistic picture what has transpired during the life cycle of the IT service ticket as well as detailed information during specific time intervals. A single display presentation interface of the story-mode UI may eliminate a need for support staff working on the IT service ticket to know where information is located and the need to navigate to different areas within the IT service ticket to collect information. Further, the story-mode UI display may, for example, provide mechanisms, controls, or functions for the support staff to ask questions to specifics posts displayed in the story section of the UI to encourage collaboration to perform other contextual actions.

Figure 7:
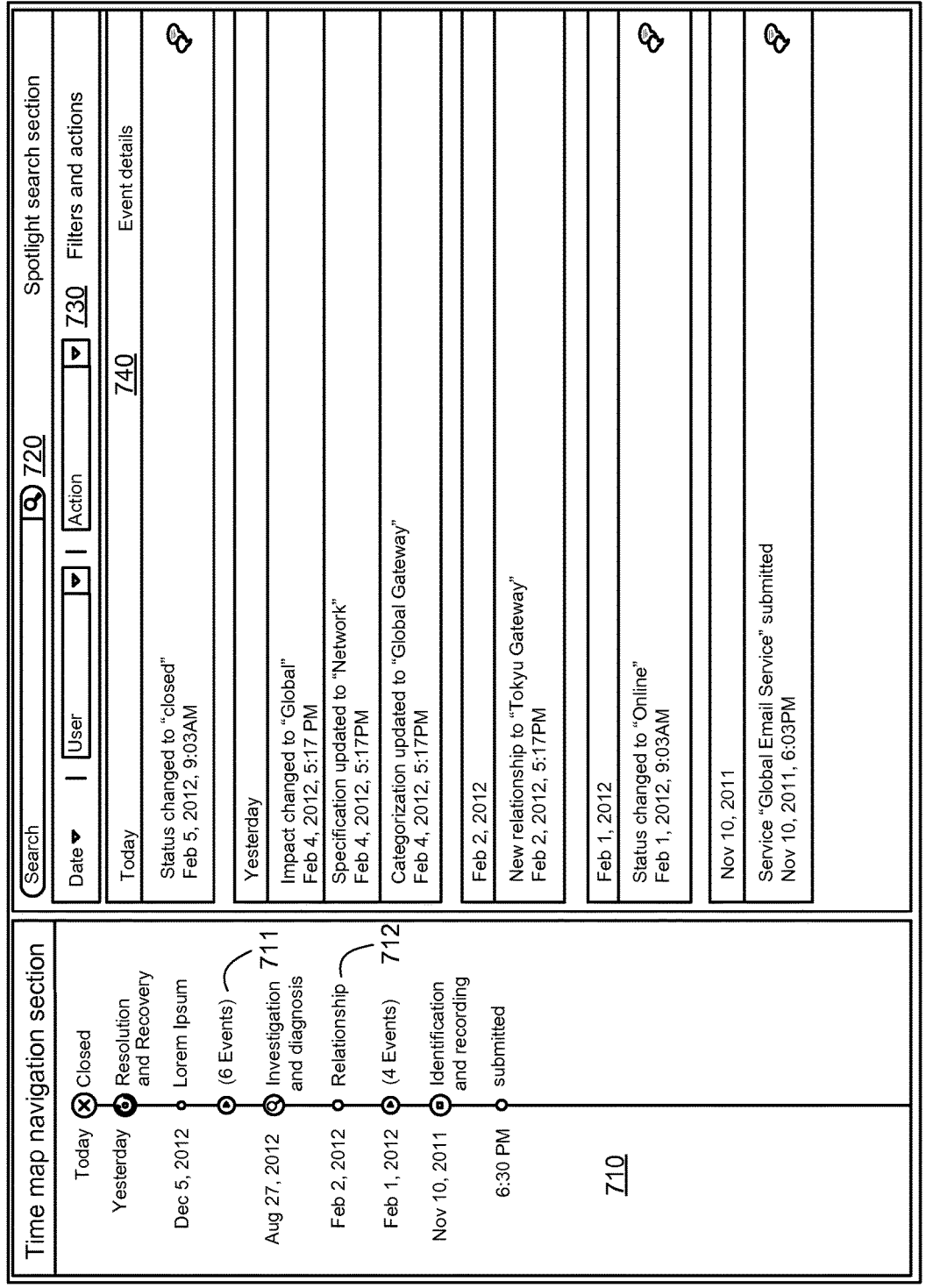
FIGS. 7 and 8 are illustrations
Figure 8:
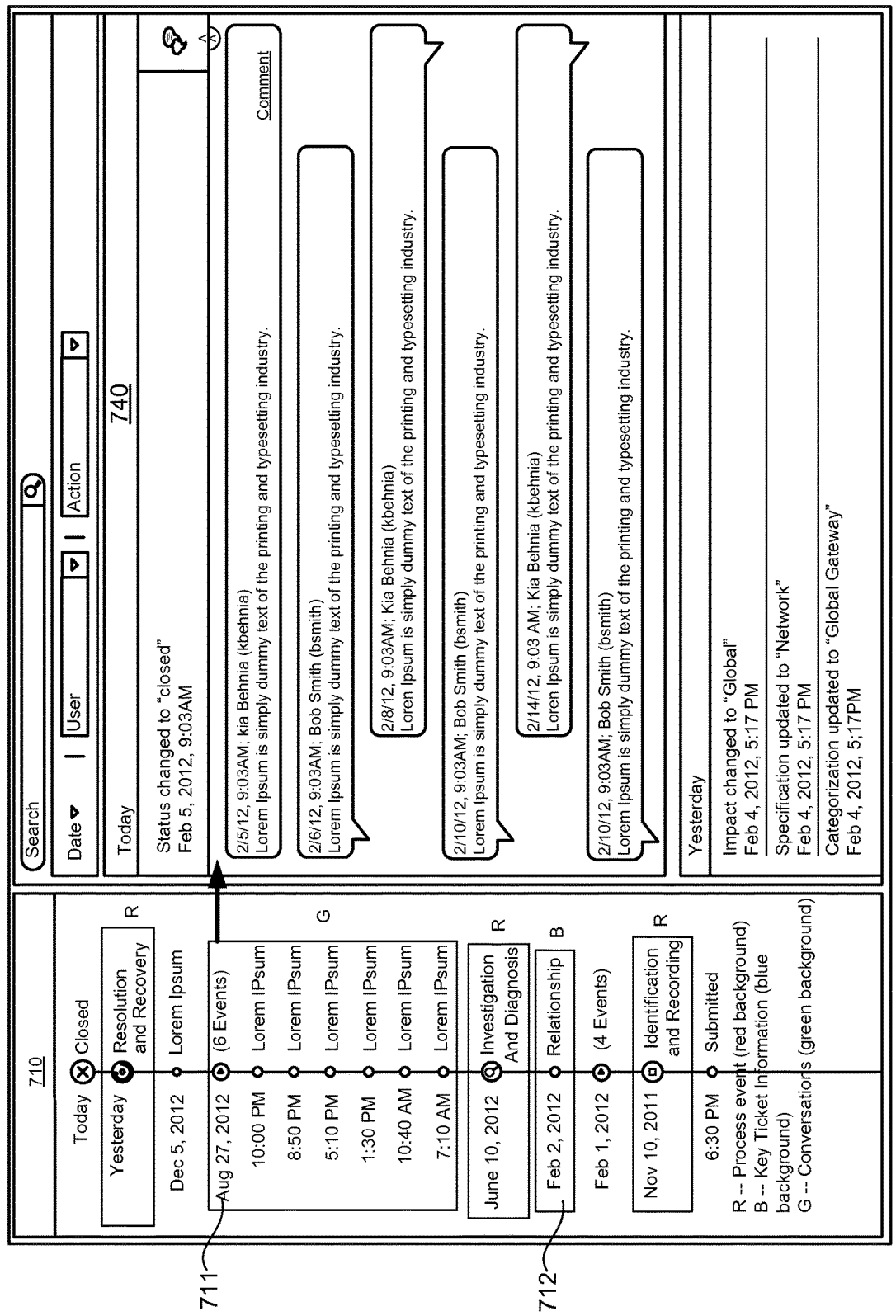

FIGS. 7 and 8 show an example story-mode UI display 700, which presents an IT service ticket in story mode, in accordance with the principles of the disclosure herein. Story-mode UI display 700 may include several regions, which may be configured to allow the support staff to explore and perform actions within the story mode display of the IT service ticket. The regions may, for example, include a time map navigation section 710, a spotlight search section 720, a filters and actions section 730, and an event details section 740. Time map navigation section 710, which may display relevant events along a time line, may be used by the support staff to identify and navigate to specific time line events within the story mode display. Spotlight search section 720 may provide the support staff with data fields to enter search terms and controls to search for information across all events captured within the story mode display. Filters and actions section 730 may provide the support staff with similar data fields to enter filter terms and controls to filter time line events (e.g. events created by a specific user, etc.), and control to perform contextual actions for a given event. Further, event details 740 region of story-mode UI display 700 may be used to display detailed information on one or more of the events displayed in time map navigation section 710. The detailed information on one or more of the events in event details section 740 may include narrative descriptions (e.g., who did what, when, where, why, in what way, by what means, etc.).

Time map navigation section 710 may be configured to present a holistic view of all major events related to the IT service ticket including, for example, process and business events, key ticket events, user entered activities and conversations. The different categories of events that may be tracked within the time map may be highlighted (e.g., by different color backgrounds or fonts) in story-mode UI display 700 so that the support staff viewing the display can visually distinguish the different categories of events. FIG. 8 schematically shows, for example, Process Events, Key Ticket Information, and Conversation types of events, which may be highlighted by different color backgrounds (e.g. red, blue, and green, respectively) on story-mode UI display 700 as a visual aid to indicate the type of event graphed in the time map.

Time map navigation section 710 may be configured to allow the support staff perform various actions to explore specific events that are mapped in the time map. The support staff may use the time map navigation to display or view corresponding detailed information regarding the event in event details section 740. A user may, for example, expand Conversation-type time map entry 711 ("Aug. 27, 2012, 6 events") shown in FIG. 7 to see details of the six events. In particular, FIG. 8 shows time map entry 711 expanded to explicitly list the six events in time map navigation section 710 and a display of the conversations corresponding to each of the six events in event details section 740.

Story-mode UI display 700 may be configured so that the support staff can interact through time map navigation section 710 to perform various actions, for example, commenting on a post or updating specific event data. For example, a Relationship entry (712) in the time map may show that a relationship between events was, for example, created or established on a particular day "Feb. 2, 2012". The support staff may modify the relationship as needed using information from event details section 740.

A story-mode UI display of the present disclosure can be a main or primary portal through which the support staff can interact with IT service tickets after the tickets have been submitted to the ITSM application. The story-mode UI display may be configured as a means for viewing and establishing relationships between ITSM data, including data, for example, in Incident and/or Configuration Item management spaces. The story-mode UI display may provide a common way for the support staff to interact with IT service tickets and ITSM data (e.g. CI data such as Asset, People, Group, Location data, etc.).

For example, a support staff working in an Incident management space of ITSM may create incidents and work to resolve them in a timely fashion. When an incident is created it may begin its own timeline within the ITSM space. As the support staff works on the resolution, he or she may determine that the cause of the incident is related to a specific CI and enter a relationship between the CI and incident. When the relationship is created, the story-mode UI display may visually depict correlation points of events on the time lines for the CI and Incident objects that tie them together.

Figure 9:
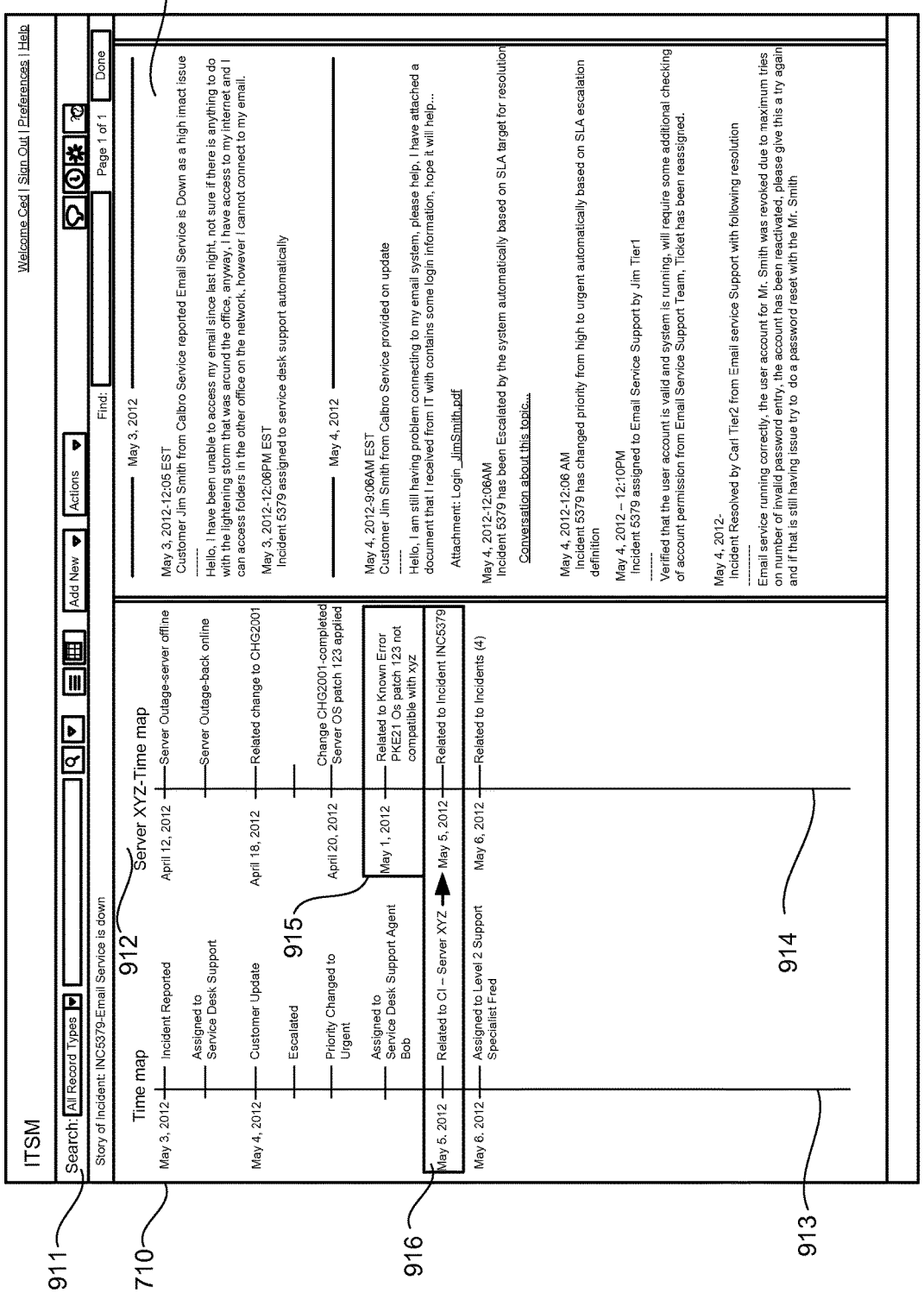
FIG. 9 is an illustration of an example Story-mode UI display with two time maps along parallel time lines for an incident and a related CI, respectively, in accordance with the principles of the disclosure herein.

FIG. 9 shows an example Story-mode UI display 900 with two time maps along parallel time lines for an incident and a related CI, in accordance with the principles of the disclosure herein. In particular, story-mode UI display 900 may present a story for an incident 911 "Email service is down." Incident 911 may be related to a particular CI 912 "Server XYZ". Story-mode UI display 900 may be configured so that time maps of events for incident 911 and related CI 912 are shown in time map navigation section 710 along parallel time lines 913 and 914, respectively. A support staff viewing the time maps may be able to visually correlate events along the two time lines to establish or confirm the relationship (916) between the incident and the particular CI. In this example shown, the support staff may see that a change 915 ("OS patch 123 incompatible with xyz") for which a Known Error PKE21 was created, was applied to the CI 912—Server XYZ. The support staff may, for example, investigate and determine if this CI change with Known Error PKE21 caused incident 811. Thus, story-mode UI display 900 may offer a way for seeing and finding events that may help with the resolution process.

In the following, practical use of a story mode UI display method to resolve IT incidents in two example scenarios is described with reference to FIGS. 10 and 11, respectively, in accordance with the principles of the present disclosure. The scenarios may involve use of an underlying forms-based ITSM—Remedy Incident Management application, which accepts and displays incident tickets to IT support staff on a UI interface (e.g., UI 107, FIG. 1). A displayed ticket may include a control or function, which allows the viewer to switch the display to a story mode.

Scenario One

Figure 10:
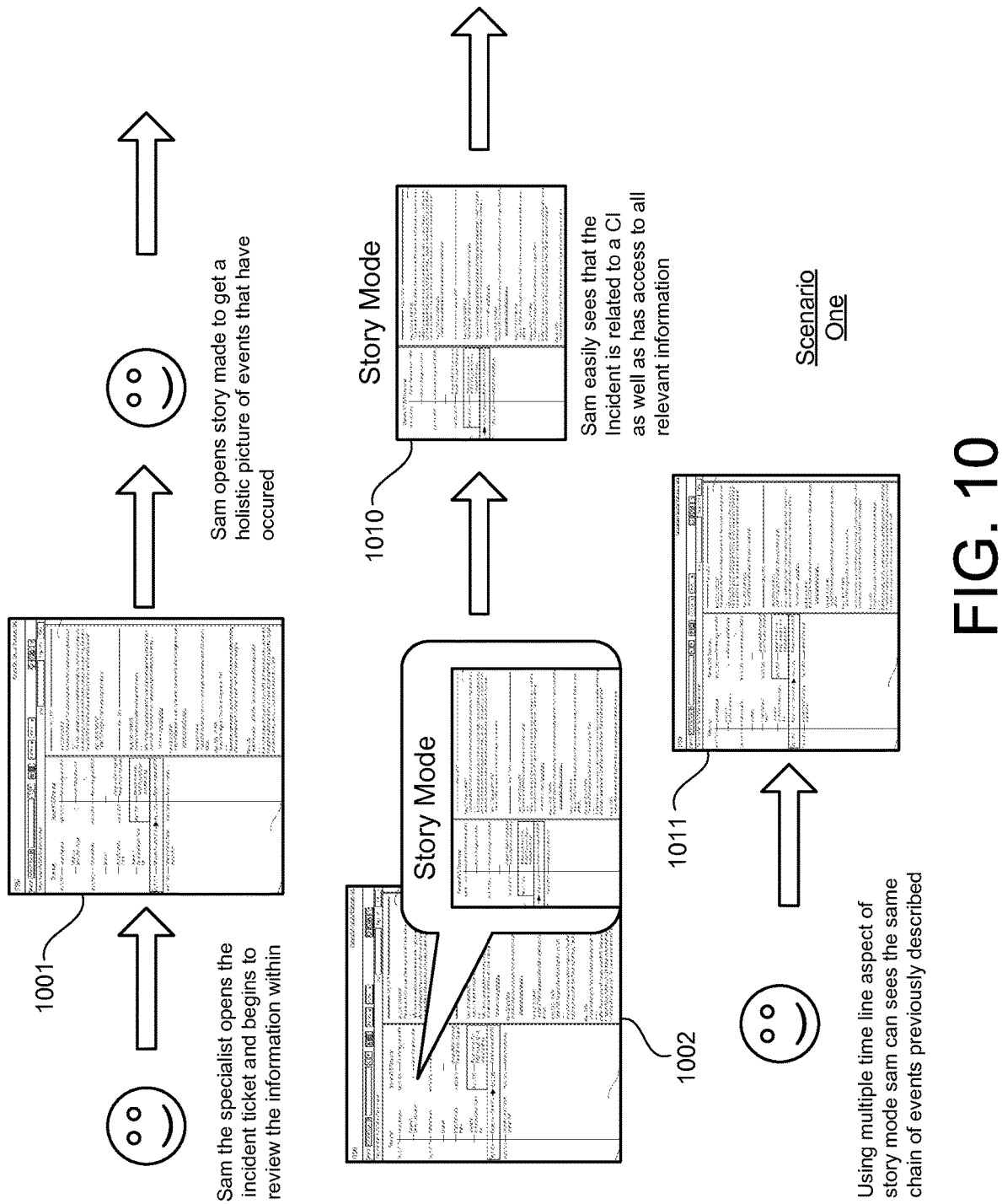
FIGS. 10 and 11 are schematic illustrations of use of a story mode UI display method to resolve IT incidents in two example practical scenarios, in accordance with the principles of the present disclosure.

FIG. 10 relates to using the story mode UI display method in Scenario One, which may involve a ticket triage process. In the scenario, a second level support staff specialist, Sam, may access an incident ticket that has been assigned to him, for example, after first line support staff were not able to resolve the incident.

As shown in the figure, Sam, the specialist, may begin the incident triage process by opening the ticket (1001). Next, Sam may activate a story mode control or function (1002) in the ticket to see a story mode display (1010), which may present a holistic picture of events that have occurred in the life cycle of the ticket. Sam may visually recognize in the visual story-mode display that the incident is related to a CI, and also have access to all relevant information. Using the multiple time line feature of the time map navigation region of the story mode display, Sam may visually identify the chain events that lead to the incident.

It will be noted that in a forms-based approach, in Scenario One, Sam would have to manually peruse through several form UIs in order to find information for resolving the incident and manually piece together time lines of events. However, using the story mode UI display method as described with reference to FIG. 10, Sam does not need to understand multiple form UIs in order to find information for resolving the incident. All related information is presented in a single story mode UI. Sam does not have to manually find information or manually piece together time lines of events.

Scenario Two

Figure 11:
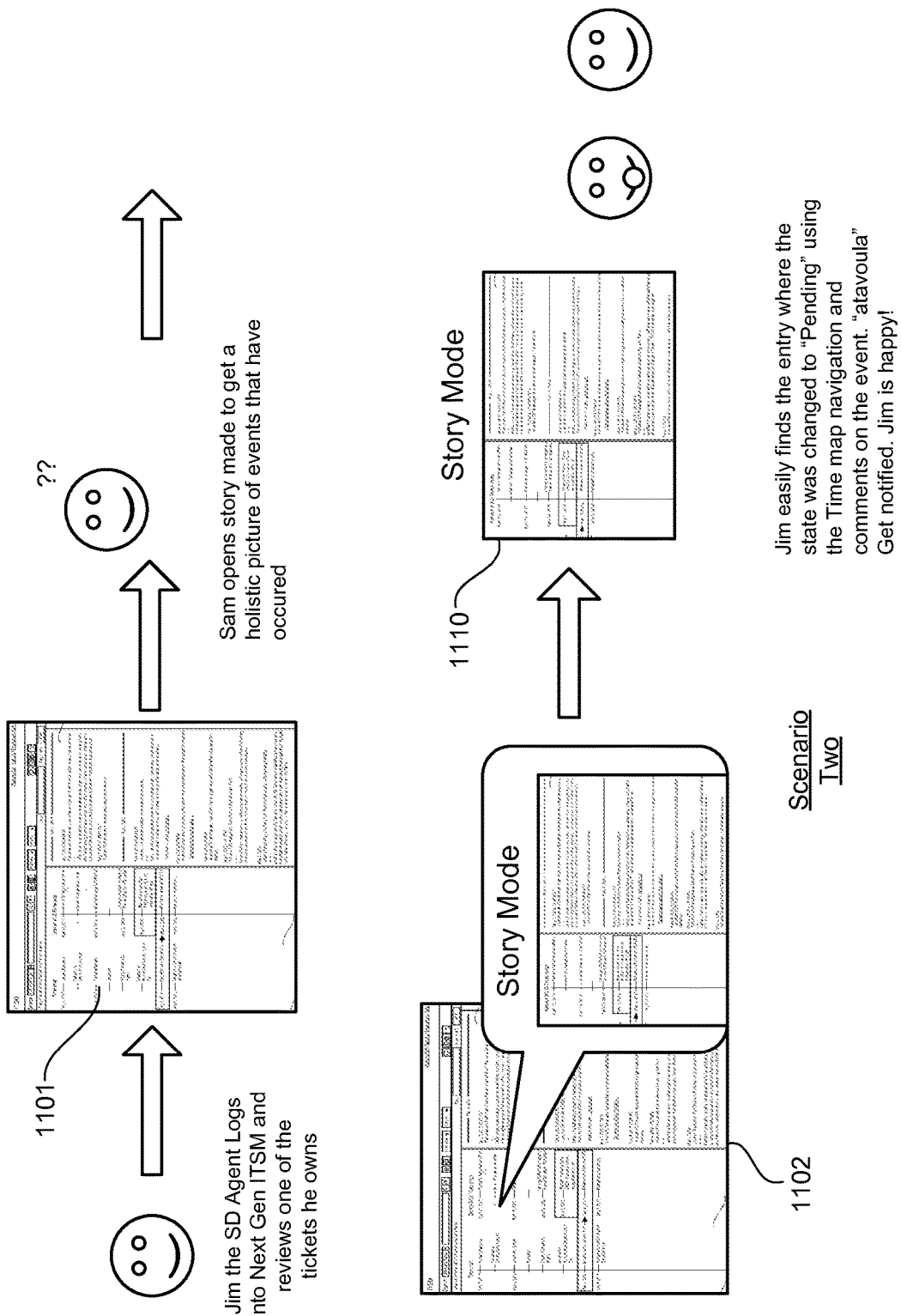

FIG. 11 relates to using the story mode UI display method in Scenario Two, which involves a situation where a status of a ticket has changed without the responsible support staff knowing about the status change.

In Scenario Two, as shown in the figure, Jim, the responsible support staff, may log into an ITSM system to discover that an active incident ticket (1101) that he was working on has its status changed to pending. Jim may want to find out how or why.

In a forms-based approach (not shown), Jim might open a work entry form in the ticket to see if it contains any information on why the ticket status was changed to pending. Jim may manually review all work entries in the form. Not finding any information there, Jim may struggle to remember which form may contain information relevant to the ticket status change. Jim may, by trial and error, open an audit form which may contain information that a person "atavoula" changed the ticket status to pending. Jim may then have to locate and personally contact this person to find out why the ticket status was changed to pending.

In contrast to this laborious form-based approach, using the story mode approach as shown in FIG. 11, Jim may after noticing the pending status of incident ticket 1101 upon logging into the ITSM system, simply activate a story mode control or function (1102) in the ticket to view a story mode display (1110). Story mode display 1110 may display a holistic picture of events that have occurred in the life cycle of the ticket. Jim may readily discern from the time map of events and the comments in the event details section of story mode display 1110 that person "atavoula" changed the ticket status and why. Jim may contact the person only if more clarification is needed.

It will be noted that by using the story mode approach, Jim does not have to manually look through forms to garner relevant event information. Further, collaboration with other support staff (e.g., "atavoula") is a relatively simple process.

Figure 12:
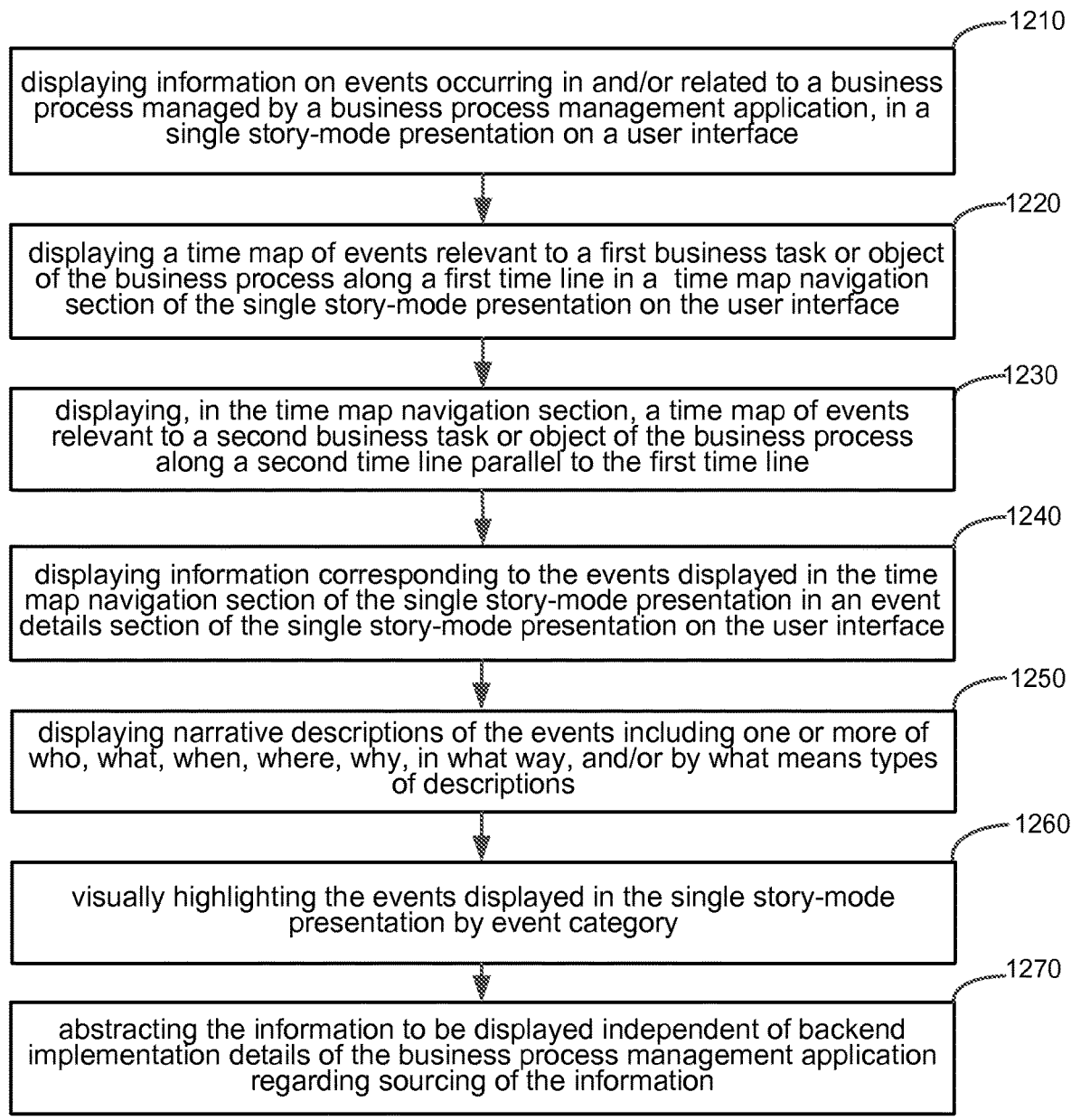
FIG. 12 is a flow chart illustration of an example method for displaying information on events occurring in and/or related to a business process managed by a business process management application, in accordance with the principles of the present disclosure.

FIG. 12 shows a flow chart illustrating of an example method 1200 for displaying information on events occurring in and/or related to a business process managed by a business process management application, in accordance with the principles of the present disclosure.

Method 1200 includes displaying the information on the events occurring in and/or related to the business process in a single story-mode presentation on a user interface (1210), displaying a time map of events relevant to a first business task or object of the business process along a first time line in a time map navigation section of the single story-mode presentation on the user interface (1220). Method 1200 may further include displaying, in the time map navigation section, a time map of events relevant to a second business task or object of the business process along a second time line parallel to the first time line (1230).

Method 1200 may also include displaying information corresponding to the events displayed in the time map navigation section of the single story-mode presentation in an event details section of the single story-mode presentation on the user interface (1240), displaying narrative descriptions of the events including one or more of who, what, when, where, why, in what way, and/or by what means types of descriptions (1250), and visually highlighting the events displayed in the single story-mode presentation by event category.

For all of the above (i.e. 1210-1260), method 1200 may involve abstracting the information to be displayed independent of backend implementation details of the business process management application regarding sourcing of the information (1270).

A non-transitory computer-readable medium may store instructions for displaying information on events occurring in and/or related to a business process managed by a business process management application, the instructions when executed by one or more processors may displaying the information on the events occurring in and/or related to the business process in a single story-mode presentation on a user interface. The single story-mode presentation may include a time map navigation section that displays a time map of events relevant to a first business task or object of the business process along a first time line, and an event details section that contains information corresponding to the events displayed in the time map navigation section of the single story-mode presentation.

Further, the instructions when executed by one or more processors may display narrative descriptions of the events including, for example, one or more of who, what, when, where, why, in what way, and/or by what means types of descriptions, and visually highlight the events displayed in the single story-mode presentation by event category.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. An apparatus, comprising:
   at least one processor; and
   a non-transitory computer-readable storage medium including instructions executable by the at least one processor to implement a user-interface displaying a workflow of a service ticket, in a first mode, in order to determine actions to take with regard to a problem in a computer system,
   the workflow traversing a plurality of management spaces of the computer system, each of the plurality of management spaces including events that share one or more dependencies, relationships, or patterns,
   in response to a request for the display of the workflow to be changed from the first mode to a story mode,
   the user-interface displaying the workflow in a story-mode presentation,
   the story-mode presentation including:
   a time map displaying one or more events of a first type related to the service ticket occurring in a first management space on a first time line, and displaying one or more events of a second type related to the service ticket occurring in a second management space on a second time line, the second time line being parallel in time to the first time line, the one or more events of the first type being different events than the one or more events of the second type; and
   event details containing one or more narrative descriptions corresponding to the one or more events displayed in the time map,
   the user-interface further including controls for marking a dependency of, a relationship between, or a pattern of the one or more events of the first type occurring in the first management space on the first time line and the one or more events of the second type occurring in the second management space on the second time line, and
   in response to a selection of at least one of the controls creating a relationship between the first time line and the second time line,
   the user-interface updating the story-mode presentation to graphically depict at least one correlation between an event of the first type occurring in the first management space along the first time line and an event of the second type occurring in the second management space along the second time line.

2. The apparatus of claim 1, wherein the actions to take with regard to the problem in the computer system include one of more of determining cause, prioritization, resolution, work around, prevention, knowledge information sharing, and remediation of the problem.

3. The apparatus of claim 1, wherein the management spaces of the computer system include one or more of incident ticket management space, change management space, problem management space, and configuration item management space.

4. The apparatus of claim 1, wherein the first management space is an incident ticket management space, and wherein events of the first and second type include one or more of causes, circumstances, and consequences of a problem or defect, barriers to a solution, and actions taken, or to be taken, to resolve the service ticket.

5. The apparatus of claim 1, wherein the second management space is a configuration item management space including configuration items, the configuration items having one or more attributes, the attributes including technical data that describes one or more capabilities of the configuration items, software version and model numbers, hardware items, manufacturer specifications, networking speeds, data storage size, ownership data, purchase date, warranty, location, identification numbers, documentation, and relationship data including relationships between hardware items, software, and users.

6. The apparatus of claim 1, wherein information on events occurring in the management spaces of the computer system is gathered from different sources based on the dependencies and/or relationships between the events, or based on a relevance of the events to the workflow of the service ticket.

7. The apparatus of claim 6, wherein the different sources include forms, or portions of forms, or other areas of a business application.

8. The apparatus of claim 1, wherein displaying the workflow in the story-mode presentation includes dynamically updating the story-mode presentation in time as events occur in the management spaces of the computer system.

9. The apparatus of claim 1, wherein the story-mode presentation user interface controls further comprise controls: to update specific event data, post comments, remark on posts, ask questions of, and comment on specific posts made by others, in the workflow of the service ticket.

10. The apparatus of claim 1, wherein the story-mode presentation user interface controls further comprise controls: to search for, or filter, events occurring in the management spaces that are displayed in the story-mode presentation.

11. A method for processing a service ticket regarding a problem in a computer system, the method comprising:
   displaying a workflow of the service ticket on a user-interface of an application, in a first mode, in order to determine actions to take with regard to the problem in the computer system,
   the workflow traversing a plurality of management spaces of the computer system, each of the plurality of management spaces including events that share one or more dependencies, relationships, or patterns,
   in response to a request for the display of the workflow to be changed from the first mode to a story mode,
   the user-interface displaying the workflow in a story-mode presentation, the story-mode presentation including:
   a time map displaying one or more events of a first type related to the service ticket occurring in a first management space on a first time line, and displaying one or more events of a second type related to the service ticket occurring in a second management space on a second time line, the second time line being parallel in time to the first time line, the events of the first type being different events than the events of the second type; and
   event details containing one or more narrative descriptions corresponding to the one or more events displayed in the time map,
   the user-interface further including controls for marking a dependency of, a relationship between, or a pattern of the one or more events of the first type occurring in the first management space on the first time line and the one or more events of second type occurring in the second management space on the second time line, and
   in response to a selection of at least one of the controls creating a relationship between the first time line and the second time line,
   the user-interface updating the story-mode presentation to graphically depict at least one correlation between an event of the first type occurring in the first management space along the first time line and an event of the second type occurring in the second management space along the second time line.

12. The method of claim 11, wherein the actions to take with regard to the problem in the computer system include one of more of determining cause, prioritization, resolution, work around, prevention, knowledge information sharing, and remediation of the problem.

13. The method of claim 11, wherein the management spaces of the computer system include one or more of incident ticket management space, change management space, problem management space, and configuration item management space.

14. The method of claim 11, wherein the first management space is an incident ticket management space, and wherein events of the first and second type include one or more of causes, circumstances, and consequences of a problem or defect, barriers to a solution, and actions taken, or to be taken, to resolve the service ticket.

15. The method of claim 11, wherein the second management space is a configuration item management space including configuration items, the configuration items having one or more attributes, the attributes including technical data that describes one or more capabilities of the configuration items, software version and model numbers, hardware items, manufacturer specifications, networking speeds, data storage size, ownership data, purchase date, warranty, location, identification numbers, documentation, and relationship data including relationships between hardware items, software, and users.

16. The method of claim 11, wherein information on events occurring in the management spaces of the computer system is gathered from different sources based on dependencies and/or relationships between the events, or based on relevance of the events to the workflow of the service ticket.

17. The method of claim 16, wherein the different sources include forms, or portions of forms, or other areas of a business application.

18. The method of claim 11, wherein displaying the workflow in the story-mode presentation includes dynamically updating the story-mode presentation in time as events occur in the management spaces of the computer system.

19. The method of claim 11, wherein the story-mode presentation user interface controls further comprise controls: to update specific event data, post comments, remark on posts, ask questions of, and comment on specific posts made by others, in the workflow of the service ticket.

20. The method of claim 11, wherein the story-mode presentation user interface controls further comprise controls: to search for, or filter, events occurring in the management spaces that are displayed in the workflow presentation.

* * * * *